United States Patent [19]

Hartung et al.

[11] Patent Number: 5,276,857
[45] Date of Patent: Jan. 4, 1994

[54] DATA PROCESSING SYSTEM WITH SHARED CONTROL SIGNALS AND A STATE MACHINE CONTROLLED CLOCK

[75] Inventors: Eytan Hartung; Jose A. Lyon; Michael E. Gladden, all of Austin, Tex.

[73] Assignee: Motorola, Inc., Schaumburg, Ill.

[21] Appl. No.: 692,350

[22] Filed: Apr. 26, 1991

[51] Int. Cl.$^5$ .............................................. G06F 1/00
[52] U.S. Cl. ............................ 395/550; 395/200; 395/575; 364/221; 364/221.6; 364/221.7
[58] Field of Search ................... 395/200, 550, 575; 364/221, 221.6, 221.7, 238

[56] References Cited
U.S. PATENT DOCUMENTS 4,622,669 11/1986 Pri-Tal .................................. 364/200
5,126,950 6/1992 Rees et al. ........................... 364/490
5,157,781 10/1992 Harwood et al. ................... 395/575

*Primary Examiner*—Dale M. Shaw
*Assistant Examiner*—D. E. Smith
*Attorney, Agent, or Firm*—Jonathan P. Meyer; Robert L. King

[57] ABSTRACT

Data processing units (14) within an integrated circuit (10) are connected by a common bus (16). Each data processing unit follows a predetermined protocol for communicating to other data processing units via the common bus (16). Further, predetermined control and/or data processing signals within the common bus (16) are multi-tasked (i.e. function multiplexed) for a normal and special modes of operation. A state machine (21) within each data processing unit (12) controls a clock circuit (23). The state machine (21) has a predetermined state diagram for controlling clock signals associated with the predetermined modes of operation.

5 Claims, 4 Drawing Sheets

DATA PROCESSING SYSTEM WITH SHARED CONTROL SIGNALS AND A STATE MACHINE CONTROLLED CLOCK

FIELD OF THE INVENTION

This invention relates generally to data processing systems, and more particularly, to data processing systems having state machines.

BACKGROUND OF THE INVENTION

Data processors which perform a variety of functions are typically implemented with a plurality of units where each unit performs a predetermined function. Further, a data processor with a plurality of units, termed a "modularized" data processor, typically communicates between the units via a commonly connected bus. For example, a modularized data processor may include units such as a central processing unit (CPU), a system integration module (SIM), and a read only memory (ROM) unit. The CPU processes data within the modularized data processor, the SIM unit coordinates communication of data processing information between each of the units, and the ROM typically contains data and instruction information for data processing.

A problem associated with a modularized data processor is structural testing of transistors within each of the modules. Historically, methods of structural testing require a dedicated test unit to communicate with a test circuit within each data processing unit of a modularized data processor. Further, the dedicated test unit historically communicates to each of the test circuits via dedicated control signals that are separate from normal data processing control signals.

Another common problem associated with a modularized data processor is controlling clocking signals within each unit to eliminate data processing problems associated with inadequate clocking signals. Common inadequacies of clocking signals within a data processing unit include, but are not limited to, insufficient control of the generation of each clocking signal, and excessive time delays for generating each clocking signal within each unit with respect to a reference master clock signal. A current method of creating clocking signals within a unit of a modularized data processor is to repeatedly buffer the reference clock signal at each unit. A problem associated with buffering the reference clock signal at each unit is an added delay associated with the repeated buffering which may cause race conditions within the modularized data processor.

As the complexity and number of units within a modularized data processor increase, which requires an increase in the number of dedicated test information signals and added test logic, a more systematic and cost effective solution to structural testing of transistors is desired. Further, as the complexity and processing speed of the modularized data processor increases, improved control of clocking signals is necessary.

SUMMARY OF THE INVENTION

The previously mentioned needs are fulfilled with the present invention. In one form, there is provided a data processing system having shared control signals utilized for both special and normal data processing modes of operation. The data processing system has a plurality of data processing units contained within an integrated circuit. Each data processing unit implements a predetermined data processing function and selectively functions independently of all other data processing units. Each of the data processing units also supports a special mode of operation within a respective unit and has a selectively activated clocking mechanism. The selectively activated clocking mechanism has a state machine for implementing, in part, the predetermined data processing function. The state machine has a predetermined number of functional states for implementing a predetermined state diagram. Each state of the state diagram is controlled by one or more control signals which selectively both identify the state and also provide timing control for the data processing unit. The state machine has an additional state which is utilized in the special mode of operation in response to a predetermined one or more of the control signals. The data processing system has a common communication bus that is coupled to each data processing unit within the integrated circuit for communicating control, address, data, and timing information to each of the data processing units. The common communication bus is coupled to an input/output pin of the integrated circuit for receiving the one or more control signals and which are selectively multi-tasked for each mode of operation of the data processing unit.

These and other features, and advantages, will be more clearly understood from the following detailed description taken in conjunction with the accompanying drawings.

DESCRIPTION OF A PREFERRED EMBODIMENT

Figure 1:
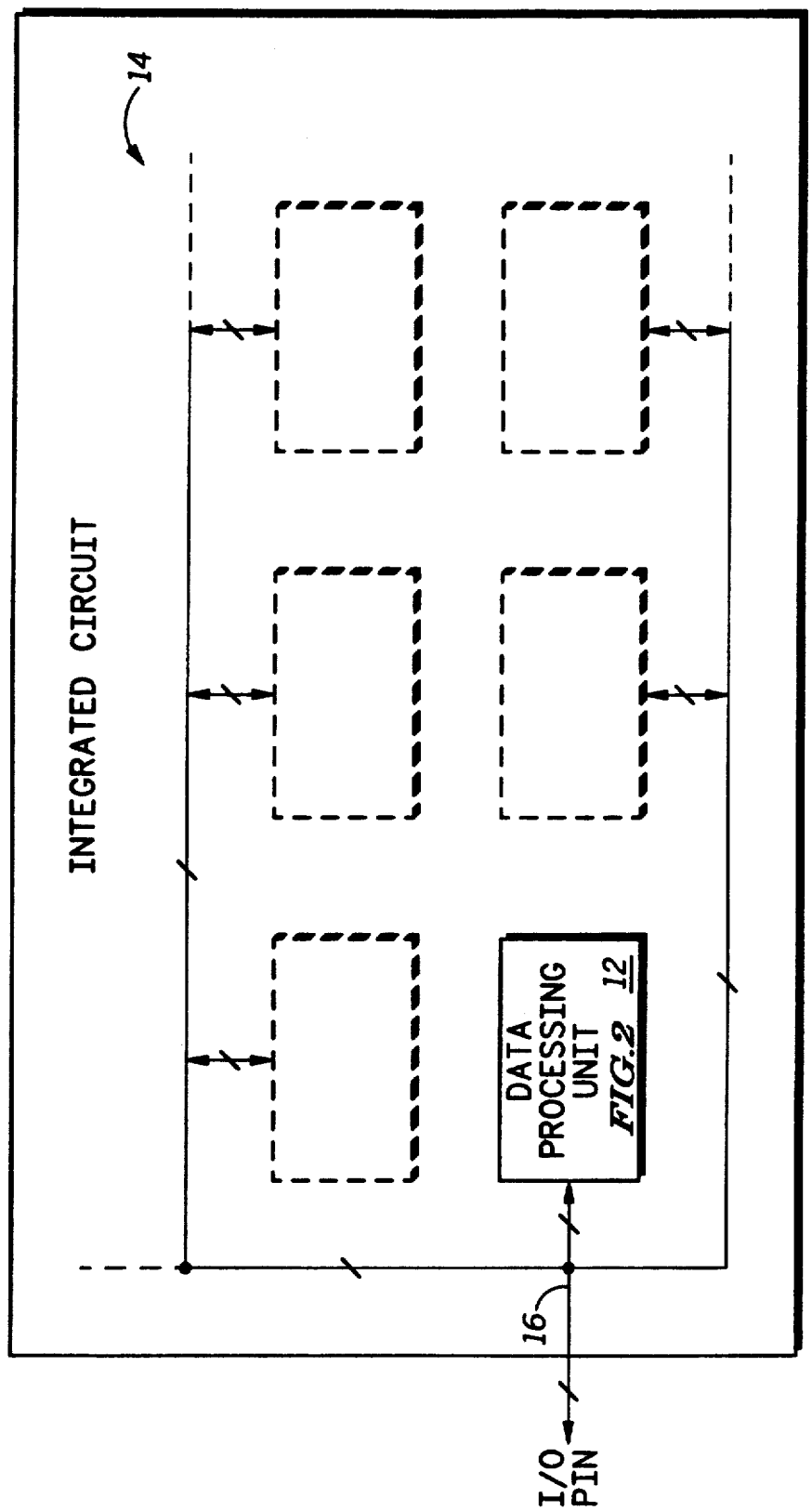
FIG. 1 illustrates in block diagram form an integrated circuit with a plurality of data processing units.

FIG. 1 illustrates an integrated circuit 10 with a data processing unit 12 and a plurality of data processing units portion 14. The data processing units portion 14 may include, but is not limited to, a read only memory (ROM), a random access memory (RAM), a system integration module (SIM), and an analog-to-digital converter unit. Each of the data processing units is connected to a bus 16 and to an input/output pin. The bus 16 is a common communication bus that contains both control information and other data processing information such as addresses, data, and timing information. The control information and other data processing information follows a predetermined communication protocol for communication between each of the data processing units. The predetermined communication protocol allows additional data processing units, to be readily added to integrated circuit 10. In one embodiment, each data processing unit may operate as a stand-along functional unit such that a source (not illustrated) external to integrated circuit 10 independently controls each of the units within integrated circuit 10. In another embodiment, integrated circuit 10 may be configured such that a predetermined data processing unit within integrated circuit 10 controls each of the other data processing units within integrated circuit 10. For example, data processing unit 12 may control any of the other data processing units within integrated circuit 10 by providing control information and other data processing information to another data processing unit. Also, in the preferred embodiment signals within bus 16 are multitasked for both a normal data processing mode of operation and a special mode of operation, such as a test mode of operation. That is, predetermined signals within bus 16, such as interrupt control signals, that are utilized for normal data processing are also utilized as test information signals in the test mode of operation.

Figure 2:
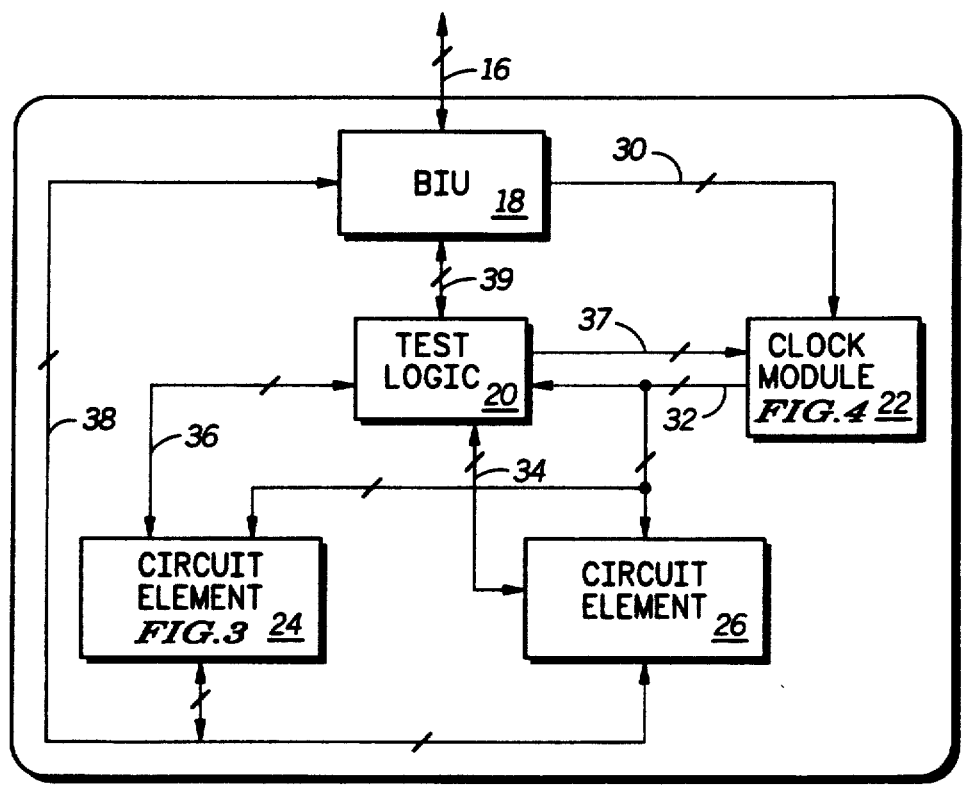
FIG. 2 illustrates in block diagram form a data processing unit within the integrated circuit of FIG. 1.

FIG. 2 illustrates in more detail the data processing unit 12 of FIG. 1. Data processing unit 12 has a bus interface unit 18 (BIU), a test logic 20, a clock module 22, a circuit element 24, and a circuit element 26. The BIU 18 has a first input/output connected to the bus 16, a second input/output connected to both a first input/output of circuit element 24 via a bus 38 and a first input/output of circuit element 26 via bus 38. The BIU 18 has a third input/output connected to a first input/output of test logic 20 via a bus 39, and an output connected to a first input of clock module 22 via a bus 30. The test logic 20 has a second input/output connected to a second input/output of circuit element 24 via a bus 36, a third input/output connected to a second input/output of circuit element 26 via a bus 34, an output connected to a second input of clock module 22 via a bus 37, and an input connected to an output of clock module 22 via a bus 32. The circuit element 24 has an input connected to an output of clock module 22 via bus 32. Similarly, circuit element 26 has an input connected to an output of clock module 22 via bus 32.

Figure 3:
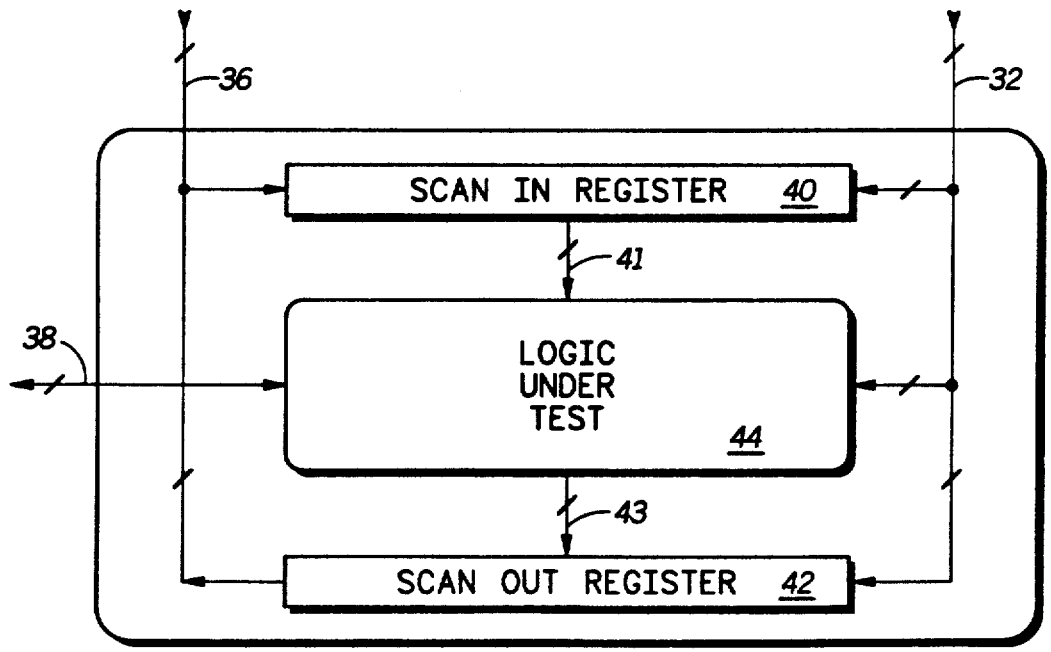
FIG. 3 illustrates in block diagram form a circuit element within the data processing unit of FIG. 2.

FIG. 3 illustrates in more detail circuit element 24 of FIG. 2. Circuit element 24 has a scan-in register 40, a scan-out register 42, and a logic under test 44. In one form, the logic under test 44 may be one of a ROM, a RAM, random data processing logic, or a programmable logic array (PLA). The scan-in register 40 has a first input connected to bus 32, a second input connected to bus 36, and an output connected to a first input of logic under test 44 via a bus 41. The scan-out register 42 has a first input connected to bus 32, a second input connected to an output of logic under test 44 via a bus 43, and an output connected to bus 36.

Figure 4:
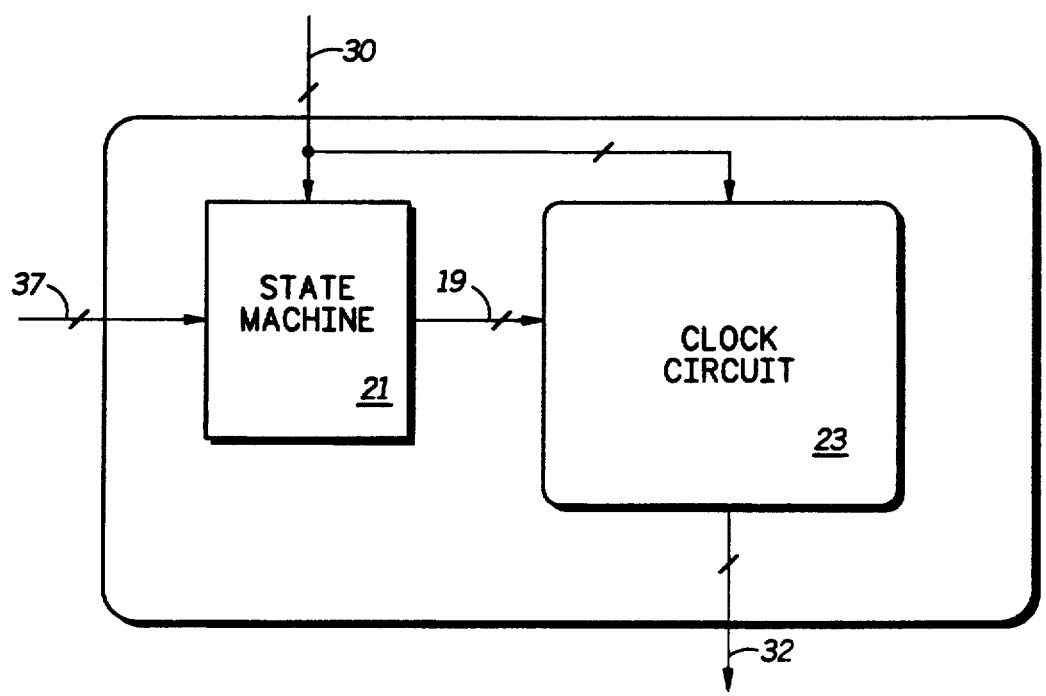
FIG. 4 illustrates in block diagram form a clock module within the data processing unit of FIG. 2.

FIG. 4 illustrates in more detail the clock module 22 of data processing unit 12. Clock module 22 has a state machine 21 and a clock circuit 23. The state machine 21 has a first input connected to bus 30, a second input connected to bus 37, and an output connected to a first control input of clock circuit 23 via a bus 19. Clock circuit 23 has a second control input connected to bus 30, and an output connected to bus 32.

Figure 5:
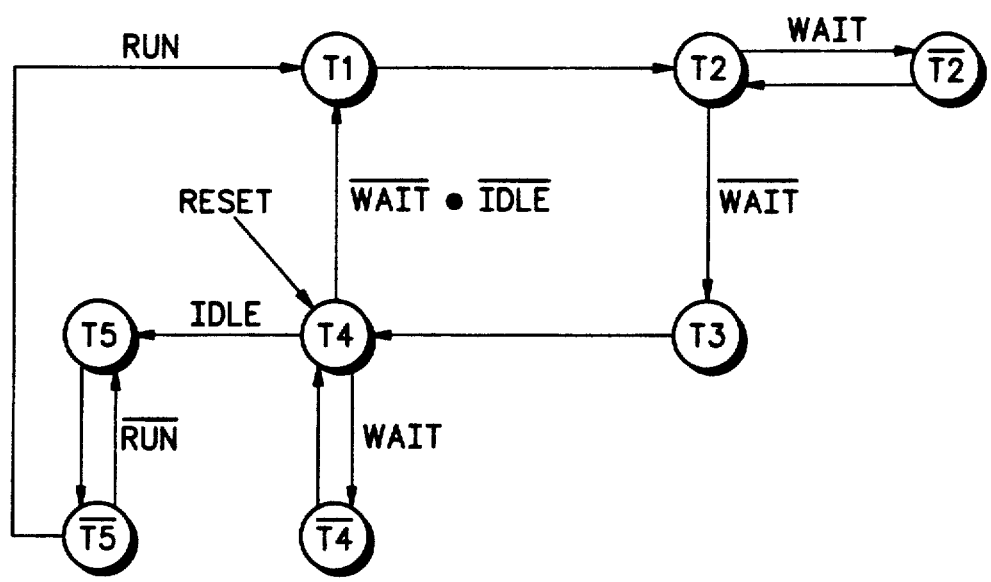
FIG. 5 illustrates in state diagram form a state diagram for the clock module of FIG. 4.

FIG. 5 illustrates a state diagram of state machine 21 of clock module 22. The state diagram has states labeled T1, T2, $\overline{T2}$,T3, T4, $\overline{T4}$, T5, and $\overline{T5}$. The state diagram also includes control signals for entering predetermined states of operation. The control state signals for entering predetermined states of operation include, but are not limited to, a Run signal, a Reset signal, a Wait signal, and an Idle signal.

Figure 6:
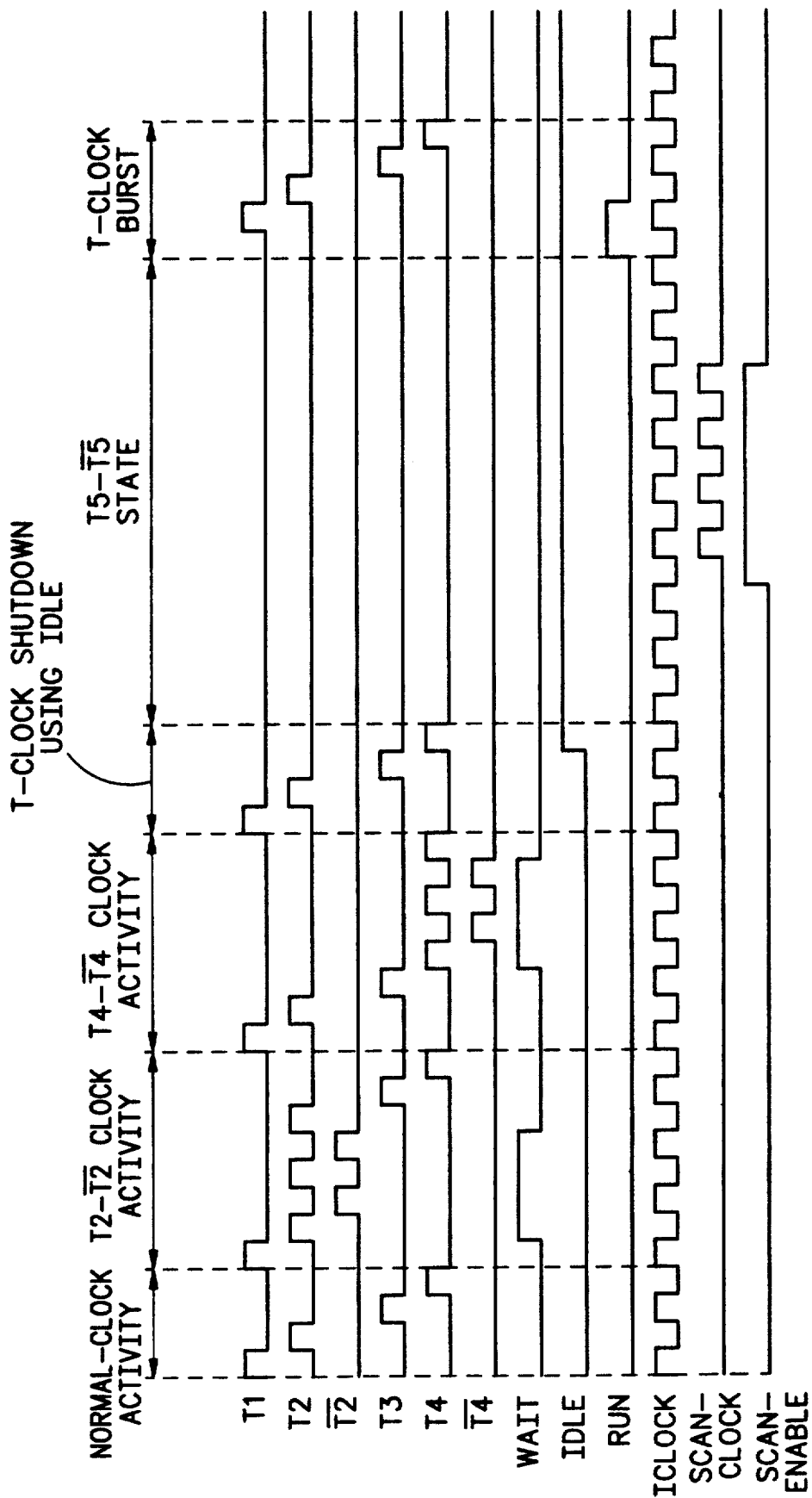
FIG. 6 illustrates in timing diagram form a timing diagram of signals within the data processing unit of FIG. 1.

FIG. 6 illustrates a timing diagram of clock signals that are generated at the output of clock circuit 23 of FIG. 4. The timing diagram illustrates a time period of normal activity, labeled "normal-clock activity," a time period labeled "T2-$\overline{T2}$ clock activity," a time period labeled "T4-$\overline{T4}$ clock activity," a clock shut down time period using an Idle signal labeled "T-clock shut down using Idle," a state where no active T-clocks are generated labeled "T5-$\overline{T5}$ state," and a time period labeled "T-clock burst." The timing diagram also illustrates timing waveforms for Wait, Idle, Run, iclock, scan-enable and scan-clock signals.

In operation, each data processing unit within integrated circuit 10 operates as a stand-alone unit that performs a predetermined function. Further, each data processing unit may be accessed from either a source (not illustrated) external to integrated circuit 10 or a predetermined other data processing unit within integrated circuit 10 via bus 16. In response to control information and other data processing information provided via bus 16, a predetermined data processing unit, such as data processing unit 12 of FIG. 2, is selectively activated. When data processing unit 12 is selectively activated, control information and other data processing information such as addresses, data, and timing information is communicated via bus 16 to BIU 18. In response to the control information and other data processing information, BIU 18 activates predetermined control signals within buses 30, 38 and 39 to control data processing within data processing unit 12. For example, during the normal data processing mode of operation an active Reset signal, an inactive Idle signal, and an active Wait signal cause state machine 21 of FIG. 4 to remain in the T4-$\overline{T4}$ state of FIG. 5. As illustrated in FIG. 6, when the Wait and Idle signals are both inactivated, state machine 21 advances to the T1 state. Once the state machine 21 is in the T1 state for a predetermined period of time, the state machine 21 advances to the T2 state. The state machine 21 conditionally remains in the T2 state based on the logic state of the Wait signal. If the Wait signal is inactive the state machine 21 advances to the T3 state. The state machine 21 remains in the T3 state for a predetermined period of time and then advances to the T4 state. The state machine 21 conditionally remains in the T4 state based on the logic state of the Reset, Idle and Wait signals. When the state machine 21 is in either the T1, T2, $\overline{T2}$, T3, T4, or $\overline{T4}$ states, clocking signals associated with the normal data processing mode of operation are generated as illustrated in the timing diagram of FIG. 6. For example, when the Run signal is activated, state machine 21 enters the T1 state. In response to state machine entering state T1, clock signal T1 is generated using conventional logic (not illustrated) within clock circuit 23 from the activated Run and iclock signals. Also, when the state machine 21 is in either the $\overline{T2}$ or the $\overline{T4}$ states, a separate clock signal within clock circuit 23 is activated. The activated clock signals are illustrated in FIG. 6 and are labeled $\overline{T2}$ and $\overline{T4}$, respectively.

In the preferred embodiment, the Idle signal is utilized to enter a test mode of operation. When the Idle signal is activated, state machine 21 advances to the T5 state. The state machine 21 conditionally remains in the T5-$\overline{T5}$ state based on the logic state of the Run signal. When state machine 21 is in the T5-$\overline{T5}$ state, clocking signals T1-T4 generated from clock module 22, are not active. In the preferred embodiment, once the Idle signal is activated only an activated Reset signal will deactivate the Idle signal. Therefore when the Run signal is activated by BIU 18, the clock machine 21 will systematically burst sequence from the $\overline{T5}$ state to the T1 state, the T2 state, the T3 state, the T4 state and then back to the T5 state and generate a T1 clock, a T2 clock, a T3 clock, and a T4 clock, respectively, as illustrated in FIG. 6. Also, during the normal data processing mode of operation when the Wait signal is activated state machine 21 causes clock circuit 23 to remain in either the T2-$\overline{T2}$ or the T4-$\overline{T4}$ states. The activated T2-$\overline{T2}$ and T4-$\overline{T4}$ clock are illustrated in the timing diagram of FIG. 6. The ability of having state machine 21 remain in either the T2-$\overline{T2}$ or the T4-$\overline{T4}$ states enables the data processing unit 12 to remain in a known state for various reasons. For example, data processing unit 12 can remain in the T2-$\overline{T2}$ state while the data processing unit 12 is awaiting additional data processing information from a separate data processing unit within integrated circuit 10 and connected to bus 16 to be transferred to BIU 18 of data processing unit 12. Once the additional data processing information from the separate data processing unit is transferred to BIU 18, state machine 21 exits the T2-$\overline{T2}$ state in response to the Wait signal being activated by BIU 18 and data processing unit 12 continues processing data.

The clocking signals created by clock circuit 23 of FIG. 4, which are illustrated in FIG. 6, are generated from a single reference clock illustrated in FIG. 6 labeled "iclock." The iclock signal is a system clock signal which is received by each unit within integrated circuit 10 to generate local clock timing signals within each data processing unit. In one embodiment, the iclock signal may be generated from within a predetermined data processing unit in integrated circuit 10, and in another embodiment the iclock signal may be provided by a source (not illustrated) external to integrated circuit 10. The iclock signal is received from bus 16 by BIU 18 of FIG. 2 and is coupled to clock module 22. Since the same iclock signal is received by each unit within the integrated circuit 10, and clocking signals within each unit are similarly created from the iclock signal, problems related to timing of clocking signals are substantially reduced throughout integrated circuit 10 for both the normal and special data processing modes of operation. For example, during the test mode of operation, the iclock signal enters data processing unit 12 of FIG. 2 and a buffered version of the iclock is routed to circuit element 24 of FIG. 3 via bus 32. In response to a control signal within bus 36, the scan-in register 40 internally generates a scan-clock signal, as illustrated in the timing diagram of FIG. 6, to scan data into circuit element 24. Similarly, a control signal within bus 36 causes scan-out register 42 to internally generate a separate scan-clock signal to scan data out of circuit element 24.

As mentioned previously, predetermined control signals utilized in the normal data processing mode of operation are multi-tasked as test information signals in the test mode of operation. For example, during the test mode of operation control signals utilized for the normal data processing mode of operation within bus 16, such as interrupt signals, are utilized in the test mode of operation as test information signals. During the test mode of operation multi-tasked signals from bus 16 received by BIU 18 instructs test logic 20 to activate the Idle signal to clock module 22 of FIG. 2 via bus 37. In response to the activated Idle signal, state machine 21 of FIG. 4 enters the T5-$\overline{T5}$ states where no active clocks are generated from clock circuit 23. After the state machine is in the T5-$\overline{T5}$ state, BIU 18 of data processing unit 12 receives additional test information from other multi-tasked signals within bus 16 from one of any sources external to data processing unit 12. The additional test information allows test logic 20 to select a predetermined circuit element, such as circuit element 24, within data processing unit 12. After circuit element 24 is selected, a multi-tasked signal provides test information in the form of serially scanned data for circuit element 24. The BIU 18 receives the test information from the multi-tasked signal and transfers the test information to test logic 20 via bus 39. Next, the test logic 20 serially scans the test information to circuit element 24 via bus 36.

FIG. 3 illustrates in more detail the testing of circuit element 24. In the illustrated form, scan-in register 40 receives both test data information and test control information via separate conductors within bus 36. Further, scan-in register 40 receives clocking signals from clock module 22 via bus 32. Control information from bus 36 enables the test data information to be scanned into scan-in register 40 with clocking signals from bus 32. The scan-in register 40 provides the test data information via bus 41 to the logic under test 44. After scan-in register 40 has received the test data information, BIU 18 of FIG. 2 activates the Run signal to clock module 22 via bus 30. In response to the activated Run signal, a burst of T-clocks are generated by clock module 22 and coupled to logic under test 44 by bus 32. An example of an activated Run signal causing a burst of T-clocks is illustrated within the timing diagram of FIG. 6. The logic under test 44 of FIG. 3 produces an output at bus 43 in response to both the information received on bus 41 and the burst of T-clocks. Also illustrated in the timing diagram of FIG. 6 is that the same T-clocks are used for both the normal and the test modes of operation. The scan-out register 42 receives the output of the logic under test 44 via bus 43. In response to control information from bus 36 and clock signals within bus 32, the scan-out register 42 provides scan-out test information on bus 36. The test logic 20 of FIG. 2 receives the scan-out test information on bus 36 and transfers the scan-out test information to BIU 18 on bus 39. In response to control information provided typically by an external source and via bus 16, BIU 18 provides the scan-out test information on a predetermined multi-tasked signal within bus 16. In one embodiment the scan-out test information is received by a tester (not illustrated) external to integrated circuit 10. The testing sequence may continue with another circuit element of integrated circuit 10 being selectively tested as described above.

To summarize, data processing unit 12 of FIG. 2 is one of a plurality of data processing units that are connected to bus 16. Each of the data processing units connected to bus 16 follows a predetermined protocol for communicating data processing information. Since a predetermined protocol is established for communications, additional data processing units may be readily added to integrated circuit 10 of FIG. 1. Further, predetermined signals within bus 16 are multi-tasked during a normal data processing mode of operation and a special mode of operation, such as a test mode of operation. The multi-tasked signals are utilized in the test mode of operation to control both the test logic 20 and the clock module 22 of FIG. 2. State machine 21 within clock module 22 is controlled by signals from both BIU 18 and test logic 20 of FIG. 2. State machine 21 controls the clocking signals generated by clock circuit 23. FIG. 5 illustrates the state diagram for state machine 21. The state diagram illustrates the various states and the signaling information required for each state. The state diagram further illustrates the flexibility that a state machine offers for controlling clocks within a data processor. The flexibility for the state machine to remain in predetermined states, such as the T5-$\overline{T5}$ states allows for enhanced design flexibility for both the normal and special modes of operation. Therefore, a plurality of data processing units each connected to a common bus with a predetermined protocol substantially reduces problems associated with system integration and expansion. Further, when signals within the commonly connected bus are multi-tasked for both normal and special modes of operation, manufacturing costs for required additional area to route additional signals are eliminated. Also, a state machine that controls clock generation within a data processor substantially increases the design flexibility with minimum circuitry and less control complexity Collectively, the above features improve the design of an integrated circuit with data processing units and at a lower cost.

By now it should be apparent that although a state machine is illustrated with eight states for clock control, additional states with additional transition paths may be utilized. Further, some states may be used in both the normal and special data processing modes of operation. Although the preferred embodiment discusses a test mode of operation as an example of a special mode of operation, other uses for special modes of operation are possible. For example, a special mode of operation may support microcode development. The microcode development may be implemented by scanning in microcode to a predetermined portion of a predetermined processing unit within integrated circuit 10 and selectively activating the predetermined portion of data processor for analysis of the microcode or the predetermined portion of the data processor or both. It should also be noted that in another form, integrated circuit 10 may be configured so that a plurality of the data processing units may be concurrently placed in special modes of operation by either an external source or one of the data processing units.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. An integrated circuit digital data processing system operative in a normal mode of operation and a test mode of operation, the system comprising:
   a communication bus comprising a plurality of signal lines, one of the plurality of signal lines carries a first signal while the integrated circuit digital data processing system is in the normal mode of operation and carries a second signal while the integrated circuit digital data processing system is in the test mode of operation; and
   a plurality of data processing units coupled to the communication bus, each of the plurality of data processing units further comprising:
   i) test mode logic means for activating a test mode control signal in response to receiving particular signals from the communication bus;
   ii) clock module means coupled to the test mode logic means for continuously generating a first sequence of clock signals while the test mode control signal is not active, for not generating any of the first sequence of clock signals while the test mode control signal is active and while a second control signal is not active and for generating a single burst of the first sequence of clock signals while the test mode control signal is active and the second control signal is active; and
   iii) logic means coupled to the clock module means and responsive to the first sequence of clock signals while the integrated circuit digital data processing system is in the normal mode of operation and while the integrated circuit digital data processing system is in the test mode of operation.

2. An integrated circuit digital data processing system according to claim 1 wherein the first sequence of clock signals further comprises: a first clock signal followed by a second clock signal followed by a third clock signal followed by a fourth clock signal.

3. An integrated circuit digital data processing system according to claim 2 wherein the first sequence of clock signals further comprises: a fourth clock signal following the second clock signal, followed by the second clock signal, when a third control signal is active.

4. An integrated circuit digital data processing system according to claim 3 wherein the first sequence of clock signals further comprises: a sixth clock signal following the fourth clock signal, followed by the fourth clock signal, when the third control signal is active.

5. An integrated circuit digital data processing system according to claim 4 wherein the clock module means ceases to generate the first sequence of clock signals after generating the fourth clock signal when the test mode control signal is active.

* * * * *